US008979325B2

(12) United States Patent
Ariyoshi

(10) Patent No.: US 8,979,325 B2
(45) Date of Patent: Mar. 17, 2015

(54) LENS AND BULB-TYPE LIGHT EMITTING DEVICE LAMP EMPLOYING THE LENS

(71) Applicant: Samsung Electronics Co., Ltd., Suwon-si (KR)

(72) Inventor: Tetsuo Ariyoshi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 13/719,904

(22) Filed: Dec. 19, 2012

(65) Prior Publication Data

US 2013/0242567 A1    Sep. 19, 2013

(30) Foreign Application Priority Data

Mar. 14, 2012    (KR) .................... 10-2012-0026193

(51) Int. Cl.
*F21V 5/04* (2006.01)
*F21K 99/00* (2010.01)
*G02B 3/08* (2006.01)
*F21Y 101/02* (2006.01)

(52) U.S. Cl.
CPC . *F21V 5/04* (2013.01); *F21K 9/135* (2013.01); *F21K 9/50* (2013.01); *G02B 3/08* (2013.01); *F21Y 2101/02* (2013.01)
USPC .................................................... 362/311.02

(58) Field of Classification Search
CPC ........... F21V 5/04; F21V 5/046; F21V 5/045; F21V 5/048; F21V 5/08; F21V 5/002–5/006
See application file for complete search history.

(56) References Cited

U.S. PATENT DOCUMENTS

| 2006/0198144 A1* | 9/2006 | Miyairi et al. ................ 362/257 |
| 2008/0100773 A1* | 5/2008 | Hwang et al. .................... 349/62 |
| 2011/0249451 A1* | 10/2011 | Fujii et al. ..................... 362/317 |
| 2012/0120666 A1* | 5/2012 | Moeller ........................ 362/308 |
| 2012/0126261 A1* | 5/2012 | Shimizu ......................... 257/88 |
| 2013/0027926 A1* | 1/2013 | Chiu et al. .................... 362/235 |

FOREIGN PATENT DOCUMENTS

| JP | 2009-37995 A | 2/2009 |
| JP | 2011-23299 A | 2/2011 |
| KR | 20-0377614 Y1 | 3/2005 |
| KR | 20-2011-0005131 U | 5/2011 |
| KR | 101059235 B1 | 8/2011 |

* cited by examiner

*Primary Examiner* — Bao Q Truong
(74) *Attorney, Agent, or Firm* — Sughrue Mion, PLLC

(57) ABSTRACT

A lens and a bulb-type light emitting device lamp employing the lens are disclosed. The lens for changing light distribution of incident illumination light and emitting the illumination light includes a light incident surface that is curved, a top surface that is planar and via which at least a portion of light incident via the light incident surface is emitted, and a side surface that is uneven and via which at least a portion of light incident via the light incident surface is emitted. The bulb-type light emitting device lamp includes the lens and a light emitting device package including one or more light emitting devices.

17 Claims, 7 Drawing Sheets

LENS AND BULB-TYPE LIGHT EMITTING DEVICE LAMP EMPLOYING THE LENS

CROSS-REFERENCE TO RELATED APPLICATIONS

This application claims priority from Korean Patent Application No. 10-2012-0026193, filed on Mar. 14, 2012, in the Korean Intellectual Property Office, the disclosure of which is incorporated herein in its entirety by reference.

BACKGROUND

1. Field

Apparatuses consistent with exemplary embodiments relate to a lens for changing light distribution of incident light, and a bulb-type light emitting device lamp having a large light distribution range by employing the lens.

2. Description of the Related Art

A light emitting diode (LED) is a semiconductor light emitting device that converts an electrical signal into light by using a characteristic of a compound semiconductor. A semiconductor light emitting device such as an LED has a long lifetime, uses a low voltage, and demands small power consumption, compared to another type of light emitting device. Also, a semiconductor light emitting device may have a fast response speed and excellent shock-resistance and may be small and light-weight. When required, a semiconductor light emitting device may generate and emit light having different wavelengths according to types and composition of a semiconductor used. Recently, lighting devices using a high-luminance light emitting device chip have been replacing existing fluorescent lamps and incandescent electric lamps.

For example, in general, an LED bulb may be formed of a cap, a heat radiation structure, a driving circuit, a printed circuit board (PCB), an LED, and a cover. In general, the cover is formed of a hemisphere-shaped glass material or a semicircle-shaped plastic material such as acryl, polycarbonate, or the like. Also, in order to form a screen on the LED in the LED bulb, with respect to a glass cover, a white diffusion coating is formed on an inner surface of the glass cover, and with respect to a plastic cover, a diffusion material is mixed in a cover material so as to realize a light diffusion effect.

However, an illumination lamp using a semiconductor light emitting device emits light in only a forward direction, not in every direction, and thus a light diffusion characteristic of a illumination lamp using a semiconductor light emitting device is highly different from that of an existing incandescent electric bulb. For example, an LED bulb emits the greatest amount of light in a forward direction, 0° direction), and the amount of light emission decreases as an angle increases, and thus the amount of light emission is almost 0 at about ±90°. On the other hand, the amount of light emission of a general incandescent electric bulb does not decrease and is almost uniform from 0° direction to about ±130° direction. Accordingly, an LED bulb and a general incandescent electric bulb are highly different regarding full width at half maximum (FWHM) such that a FWHM of an LED bulb is about 130° whereas a FWHM of a general incandescent electric bulb is about 260°. The difference occurs because a filament used in a general incandescent electric bulb emits light in every direction (range of 360°) whereas an LED emits light in only a forward direction (range of about 120°). Due to the difference, when an LED bulb is used in a general illumination lamp, light diffusion and luminous intensity is significantly different from those that users are familiar with. This may be an obstacle to spreading of an LED bulb.

SUMMARY

One or more exemplary embodiments provide a lens having a structure capable of changing light distribution of incident light, and a bulb-type light emitting device lamp realizing a large light distribution range by employing the lens.

Additional aspects will be set forth in part in the description which follows and, in part, will be apparent from the description, or may be learned by practice of the presented exemplary embodiments.

According to an aspect of an exemplary embodiment, a lens for changing light distribution of incident illumination light and emitting the illumination light includes a light incident surface having a first curved surface and a second curved surface; a top surface that is planar; and a side surface that is uneven. Light incident on the first curved surface is emitted via the top surface and light incident on the second curved surface is emitted via the side surface.

The lens may have a shape that is rotationally symmetrical with respect to a central axis.

A majority of the light transmitted through the first curved surface may be emitted via the top surface, and a majority of the light transmitted through the second curved surface may be emitted via the side surface.

The light incident surface may face the top surface and may be recessed toward the top surface.

the first curved surface may be disposed along the central axis, and the second curved surface may radially surround the first curved surface.

The first curved-surface may be a concave surface for diverging incident light, and the second curved-surface may be a convex surface for converging incident light.

A radius of curvature of the first curved surface may be smaller than a radius of curvature of the second curved surface.

The first curved-surface may be shaped such that light incident on the top surface via the first curved surface is transmitted through the top surface.

The second curved-surface may be shaped such that light incident on the top surface via the second curved surface may be totally internally reflected at the top surface.

The first curved-surface may be a spherical surface whose curvature radius R1 satisfies an inequality below.

1.5 mm<R1<21 mm

The second curved-surface may be a spherical surface whose curvature radius R2 satisfies an inequality below.

17 mm<R2<21 mm

Incident light having a distribution angle within 180° may be dispersed by the lens, such that output light has a distribution angle equal to or greater than 300°.

According to an aspect of another exemplary embodiment, a bulb-type light emitting device lamp includes a light emitting device package that includes one or more light emitting devices; a body that has a mount surface on which the light emitting device package is mounted; a lens that has the aforementioned structure and changes distribution of light emitted from the light emitting device package; and a cover that has a bulb-shape and that is arranged above the body so as to entirely cover the light emitting device package and the lens.

The body may be formed of a heat radiation material.

A heat radiation pattern may be formed on the body, or a plurality of heat radiation fins may be formed on the body.

The body may have an inner space, and a driving circuit may be disposed in the inner space so as to drive the light emitting device package.

The cover may be formed of a transparent material that is mixed with a diffusion material for diffusing light emitted from the one or more light emitting devices.

The cover may be formed of the transparent material that is mixed with the diffusion material and a fluorescent material, or a fluorescent material may be further coated on the cover.

BRIEF DESCRIPTION OF THE DRAWINGS

These and/or other exemplary aspects and advantages will become apparent and more readily appreciated from the following description of the exemplary embodiments, taken in conjunction with the accompanying drawings of which.

DETAILED DESCRIPTION

Figure 1:
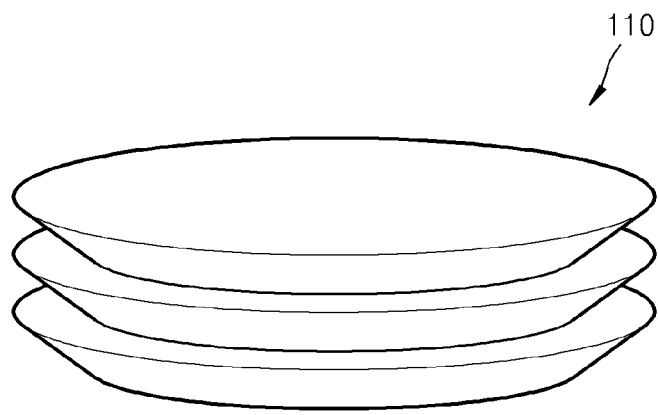
FIG. 1 is a perspective view illustrating a shape of a lens according to an exemplary embodiment.

Reference will now be made in detail to exemplary embodiments which are illustrated in the accompanying drawings. In the drawings, like reference numerals in the drawings denote like elements, and the size of each component may be exaggerated for clarity.

Figure 2:
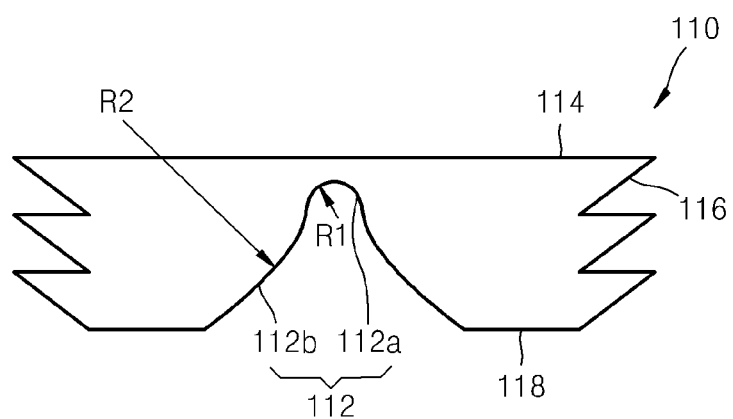
FIG. 2 is a cross-sectional side view of the lens of FIG. 1.

FIG. 1 is a perspective view illustrating a shape of a lens 110 according to an exemplary embodiment, and FIG. 2 is a cross-sectional side view of the lens 110 of FIG. 1.

The lens 110 is configured to change light distribution of incident illumination light and then to emit the illumination light, and includes a light incident surface 112 that is curved, a top surface 114 via which at least a portion of light that is incident via the light incident surface 112 is emitted, and a side surface 116 via which at least a portion of light that is incident via the light incident surface 112 is emitted. As illustrated, the top surface 114 may be planar, and the side surface 116 may be uneven. For example, the side surface 116 may be prismatic or have a serrated shape. A shape of the uneven surface is not limited to what is illustrated in FIG. 2 and thus may have various patterns via which incident light is refracted and emitted in random directions. Also, the lens 110 may further include a bottom surface 118 that connects the side surface 116 and the light incident surface 112, that faces the top surface 114, and that is planar. However, in another embodiment, the side surface 116 and the light incident surface 112 may be directly connected.

As illustrated, the lens 110 may have a shape that is rotationally symmetrical with respect to a central axis. In such a case, an outer radius of the lens 110, as measured at the side surface, may vary, in a direction of the central axis due to the unevenness of the side surface.

The light incident surface 112 may be a surface that faces the top surface 114 (i.e. The surface that is opposite the top surface) and may be recessed toward the top surface 114. A center portion of the light incident surface 112 may have a shape of a first curved-surface 112a, and a side portion of the light incident surface 112 may have a shape of a second curved-surface 112b that is different from the first curved-surface 112a. For example, the first curved-surface 112a may be a concave surface which diverges incident light, and the second curved-surface 112b may be a convex surface which converges incident light. For example, the first curved-surface 112a may be a concave surface formed as a spherical surface whose curvature radius is R1, and the second curved-surface 112b may be a convex surface formed as a spherical surface whose curvature radius is R2.

The aforementioned structure of the lens 110 enables light distribution of incident light having a distribution angle within 180° to be changed to light distribution of incident light having a distribution angle equal to or greater than 300°. Here, a distribution angle indicates a full width at half maximum (FWHM), i.e., an angle width at which intensity of incident light is half of peak intensity. For example, a distribution angle of light distribution of light that is generated and emitted by a light emitting device is small, that is within 180°, and in this regard, because such a light distribution is different from light distribution of a general incandescent electric bulb, users may feel uncomfortable. Thus, the aforementioned structure of the lens 110 is developed to provide a bulb-type lamp having a large light distribution range while a light emitting device is used.

Particular values or scopes of R1 and R2 may be appropriately determined in consideration of light distribution that is realized by a bulb-type lamp employing the lens 110, and this will be described in detail with reference to FIG. 7 and subsequent drawings that illustrate light distribution.

Figure 3:
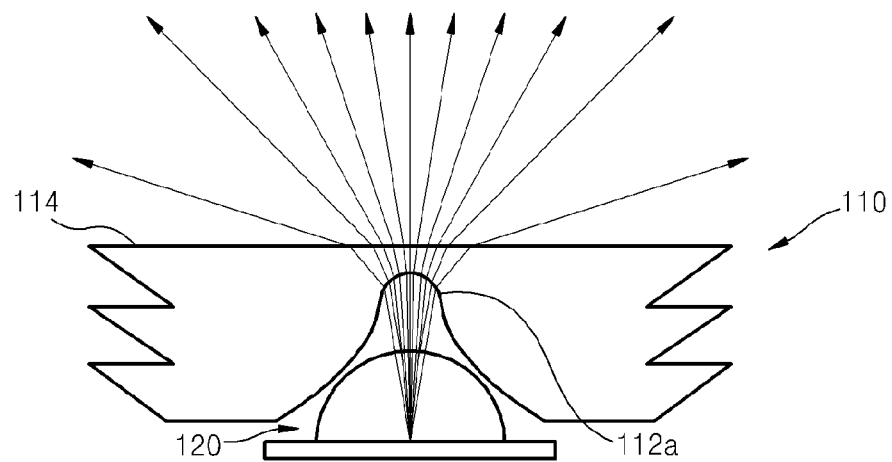
FIG. 3 illustrates a light path on which light that is generated and emitted by a light emitting device passes through the lens of FIG. 1, wherein, on the light path, light that is incident on a first curved-surface travels upward.

FIG. 3 illustrates light paths on which light that is generated and emitted by a light emitting device package 120 passes through the lens 110, wherein, on the light paths, light that is incident on the first curved-surface 112a travels upward and then is emitted via the top surface 114.

Light generated and emitted by the light emitting device package 120 is incident on the lens 110 and has a larger distribution after the light passes through a curved surface for diverging incident light, e.g., the first curved-surface 112a formed as a concave surface. The first curved-surface 112a may be shaped such that, when a majority of the light incident on the lens 110 via the first curved-surface 112a reaches the top surface 114, the light has an angle that is less than a critical angle for total reflection. That is, the majority of light that reaches the top surface 114 via the first curved-surface 112a is emitted via the top surface 114. Also, after the light passes through the lens 110, the light has a larger distribution, as compared to the light emitted from the light emitting device package 120. Referring to FIG. 3, none of the light that passes through the first curved-surface 112a is totally reflected at the top surface 114 but rather, all of the light shown that passes through the first curved surface is refracted and emitted via the top surface 114 of the lens 110. However, this is exemplary. According to a shape or a size of the first curved-surface 112a, a portion of light that passes through the first curved-surface 112a may be incident at an angle greater than a critical angle for total reflection and thus may be totally internally reflected at the top surface 114. Although reflected light is not shown in FIG. 3, similar to a path shown in FIG. 4, the light may be emitted toward a side portion or a lower portion of the lens 110 via the side surface 116 having an uneven shape.

Figure 4:
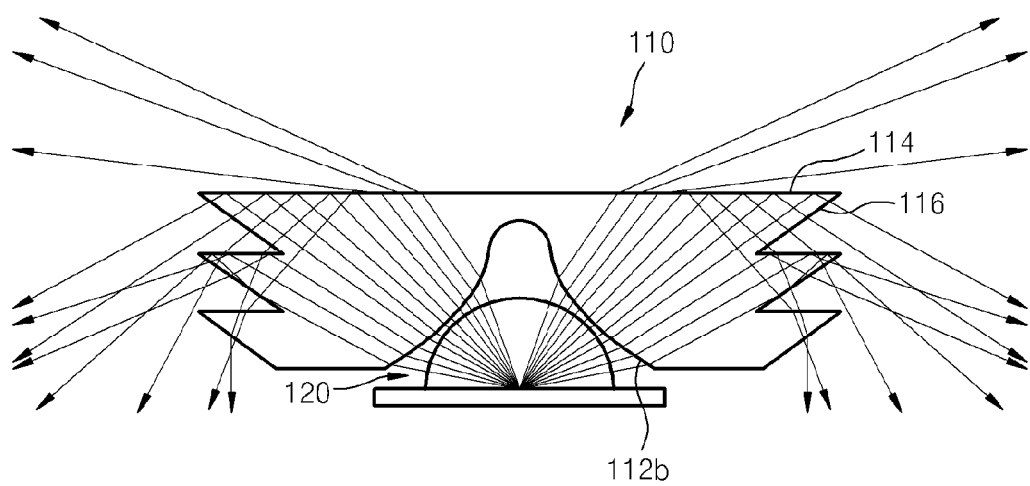
FIG. 4 illustrates a light path on which light that is generated and emitted by a light emitting device passes through the lens of FIG. 1, wherein, on the light path, light that is incident on a second curved-surface travels toward a side portion and a lower portion of the lens.

FIG. 4 illustrates light paths on which light that is generated and emitted by the light emitting device package 120 passes through the lens 110, wherein, on the light paths, light that is incident on the second curved-surface 112b travels toward the side portion and the lower portion of the lens 110.

Light generated and emitted by the light emitting device package 120 that is incident on the curved surface for converging incident light, e.g., the second curved-surface 112b formed as a convex surface, has a smaller distribution after the light passes into the lens 110 through the second curved surface 112b. The second curved-surface 112b may be shaped such that a majority of the light incident on the lens 110 via the second curved-surface 112b reaches the top surface 114 at an angle greater than a critical angle for total reflection. That is, the majority of light that reaches the top surface 114 via the second curved-surface 112b is totally internally reflected at the top surface 114 and then travels toward the side surface 116, having an uneven shape, and according to an angle with respect to the side surface 116, the light is emitted from the lens 110 toward the side portion and the lower portion of the lens 110. Also as shown in FIG. 4, the first curved surface 112a and the second curved surface 112b may be formed such that a larger amount of light passes through the second curved surface than the first curved surface.

As described above, light that is emitted by the light emitting device package 120 has a light distribution having a distribution angle within about 180° and is incident on the lens 110 via the first curved-surface 112a or the second curved-surface 112b, and according to light paths, the light is emitted from the lens 110 toward a top portion, the side portion, or the lower portion of the lens 110. Thus, by using the lens 110, a bulb-type light emitting device lamp having a large light distribution range may be formed.

Figure 5:
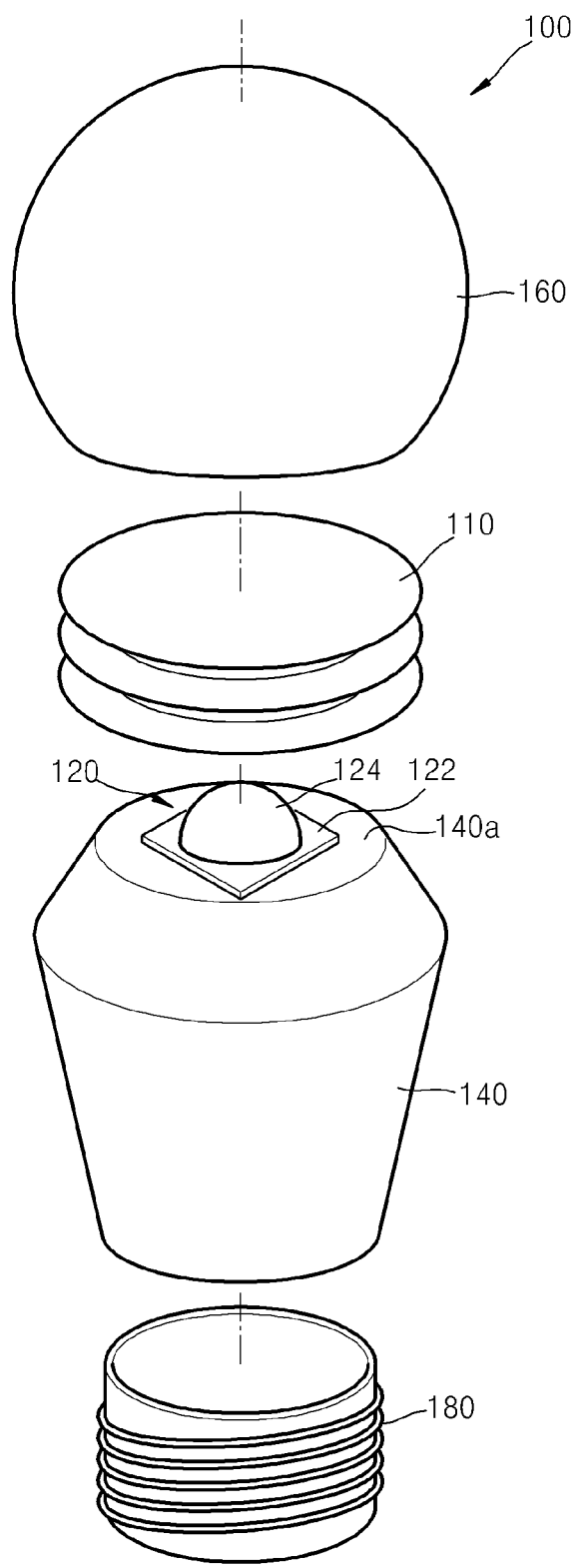
FIG. 5 is an exploded perspective view illustrating a structure of a bulb-type light emitting device lamp, according to an exemplary embodiment.
Figure 6:
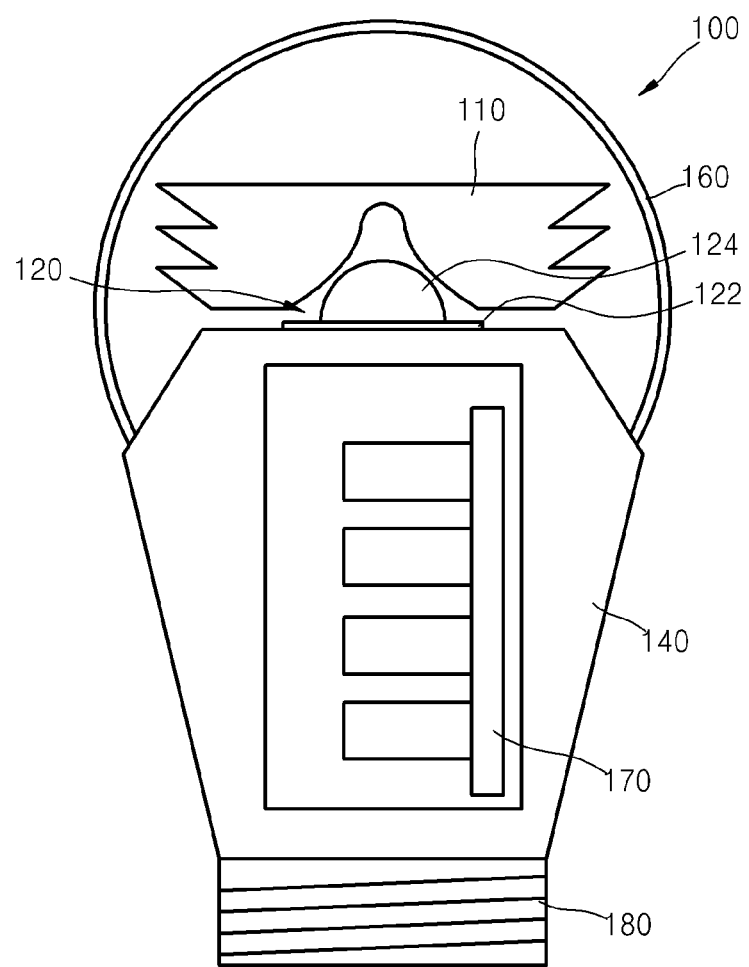
FIG. 6 is a cross-sectional side view of the bulb-type light emitting device lamp of FIG. 5.

FIG. 5 is an exploded perspective view illustrating a structure of a bulb-type light emitting device lamp 100, according to an exemplary embodiment. FIG. 6 is a cross-sectional side view of the bulb-type light emitting device lamp 100 of FIG. 5.

Referring to FIGS. 5 and 6, the bulb-type light emitting device lamp 100 includes a light emitting device package 120 that includes one or more light emitting devices (not shown), a body 140 that has a mount surface 140a on which the light emitting device package 120 is mounted, the lens 110 for changing distribution of light emitted from the light emitting device package 120, and a cover 160 that is arranged above the body 140 so as to entirely cover the light emitting device package 120 and the lens 110.

The light emitting device package 120 includes one or more light emitting devices that are formed on a substrate 122, a wiring structure that applies a voltage to the one or more light emitting devices, and a protective layer 124 that protects the one or more light emitting devices and the wiring structure.

Each light emitting device includes a semiconductor active layer in which light is generated by combination of an electron and a hole in response to a voltage applied thereto, and a material of the active layer may be determined according to a wavelength band of light to be generated. In more detail, each light emitting device may include a first-type semiconductor layer, an active layer, and a second-type semiconductor layer that are sequentially stacked, and each of the first-type semiconductor layer, the active layer, and the second-type semiconductor layer may be formed of a compound semiconductor. For example, the first-type semiconductor layer and the second-type semiconductor layer may be formed of a nitride semiconductor, e.g., a composition of $Al_xIn_yGa_{(1-x-y)}N$ ($0\leq x\leq 1, 0\leq y\leq 1, 0\leq x+y\leq 1$), and may be doped with an n type impurity and a p type impurity, respectively. The active layer is interposed between the first-type semiconductor layer and the second-type semiconductor layer, and emits light having a predetermined energy according to recombination of an electron and a hole. The active layer may have a structure in which a plurality of layers with a composition of $InxGa_{1-x}N$ ($0\leq x\leq 1$) are stacked such that a band gap energy can be adjusted according to an indium content in the active layer. In this case, the active layer may have a multi-quantum well (MQW) structure in which a quantum barrier layer and a quantum well layer are alternately stacked, e.g., the active layer may have an InGaN/GaN structure, and thus an emission wavelength band may be adjusted in response to adjustment of the indium content. Also, each light emitting device may realize white light by including phosphors. For example, the indium content may be adjusted to generate blue light in the active layer, and by using a phosphor that excites red light by absorbing blue light and a phosphor that excites green light by absorbing blue light, a portion of blue light emitted from the active layer is changed to red light, and another portion of the blue light is changed to green light, and thus white light is generated by mixing the blue light, the red light, and the green light. Alternatively, yellow phosphor may be used, and in this case, a portion of blue light emitted from the active layer may be changed to yellow light, so that white light may be generated by mixing the blue light and the yellow light. The phosphors may be mixed to a material that forms the protective layer 124.

The lens 110 is substantially the same as the lens 110 described above with reference to FIGS. 1 through 4, and changes distribution of light emitted from the light emitting device package 120 so as to realize a large light distribution range.

The body 140 may be formed of a heat radiation material, e.g., a metal material having excellent thermal conductivity. A top surface of the body 140 may be the mount surface 140a of the light emitting device package 120. Also, in order to increase a surface area for efficient heat radiation, a heat radiation pattern (not shown) or a plurality of heat radiation fins (not shown) may be formed on the body 140.

Also, the body 140 may have an inner space, and a driving circuit 170 may be disposed in the inner space so as to drive the light emitting device package 120. In this regard, detailed connection between the light emitting device package 120 and the driving circuit 170 is not illustrated here.

The cover 160 may be formed of a material that diffuses light emitted from the light emitting device package 120. For example, the cover 160 may be formed of a transparent plastic material including poly carbonate (PC), poly methyl methacrylate (PMMA), acrylic, or the like, or a glass material. Also, when required, the cover 160 may be formed of a material capable of diffusing light emitted from the light emitting device package 120, e.g., the cover 160 may be formed of a diffusion resin obtained by mixing a diffusion material with a polycarbonate resin or an acryl resin, or a glass having one surface coated with a white color diffusion paint.

Also, in order to help a color change of light emitted from a light emitting device, a fluorescent material may be further coated on the cover 160, or the cover 160 may be formed of a material obtained by mixing a diffusion material and a fluorescent material. The cover 160 may have a bulb-shape.

The bulb-type light emitting device lamp 100 may further include a cap 180 that is arranged in a lower portion of the body 140 so as to connect the driving circuit 170 and an external power source. The cap 180 may have a dimension that can be mounted to a power supply socket for a general incandescent electric bulb.

Figure 7:
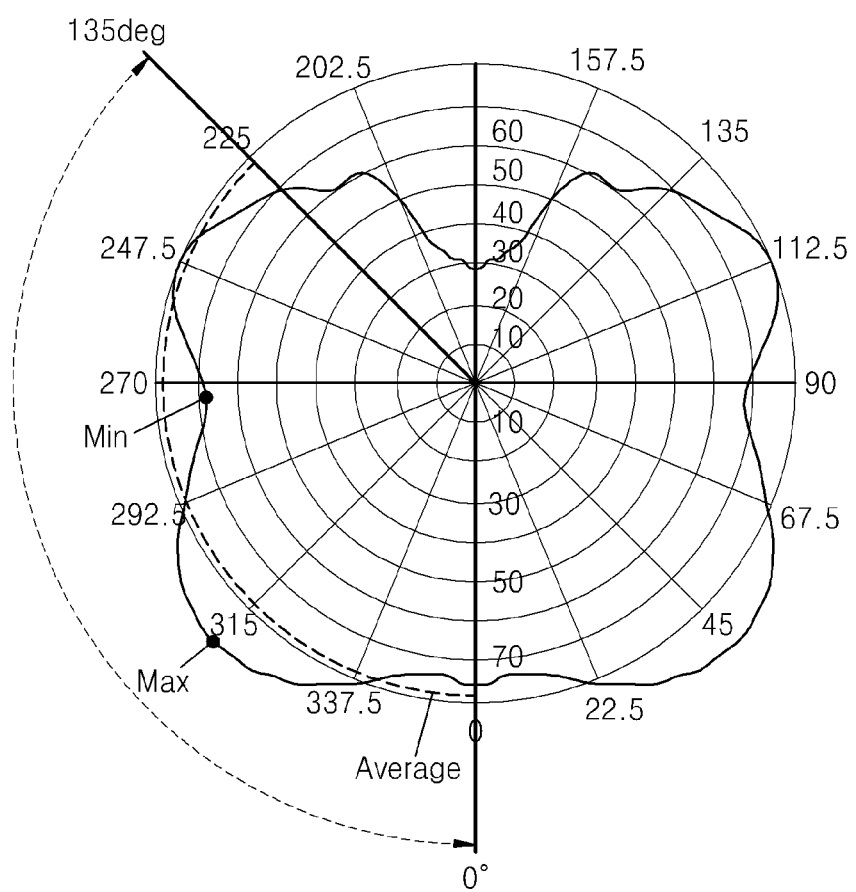
FIG. 7 illustrates light distribution that is realized by the bulb-type light emitting device lamp of FIG. 5.

FIG. 7 illustrates light distribution that is realized by the bulb-type light emitting device lamp 100 of FIG. 5. Referring to FIG. 7, the light distribution has a distribution angle of about 320°. The light distribution corresponds to an example in which a value of R1 and a value of R2 of the lens 110 employed in the bulb-type light emitting device lamp 100 are 2 mm and 19 mm, respectively. However, these values of R1 and R2 are exemplary and thus may be changed in consideration of patterns of the light distribution. Referring to the light distribution, illumination intensity does not have a constant value across various positions but has a minimum value Min and a maximum value Max. For example, the values of R1 and R2 may be set to allow a deviation value that the minimum value Min and the maximum value Max deviate from an average value Average to remain in an appropriate range. Here, the minimum value Min and the maximum value Max are defined within a range between 0° through 135°.

Figure 8:
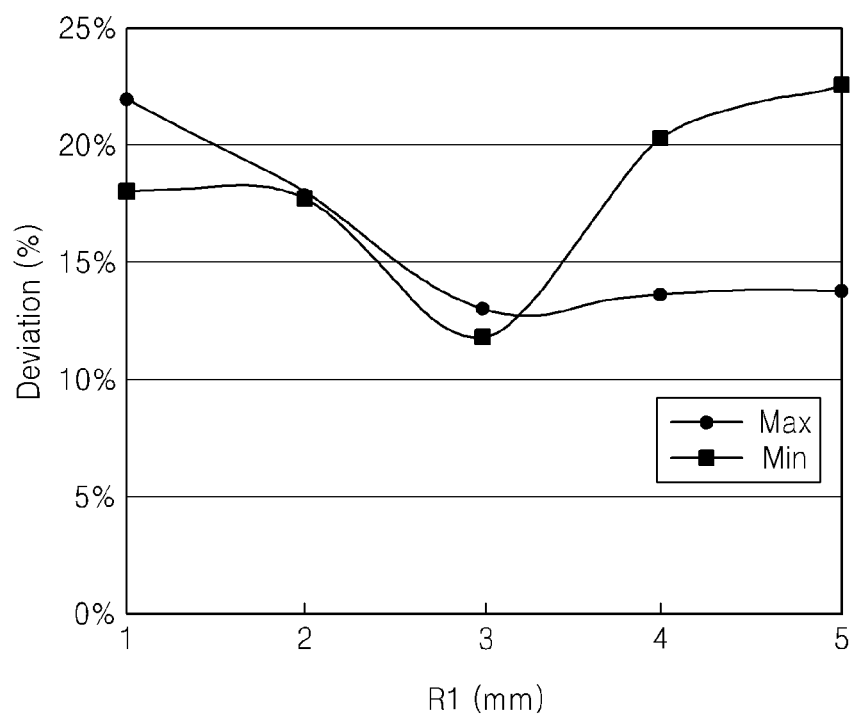
FIG. 8 is a graph showing a deviation value that a minimum value and a maximum value of light distribution deviate from an average value, with respect to a radius of curvature of a first incident surface of a lens used in the bulb-type light emitting device lamp of FIG. 5.

FIG. 8 is a graph showing a deviation value that a minimum value Min and a maximum value Max of light distribution deviate from an average value, with respect to a radius of curvature radius R1 of a first incident surface of a lens used in the bulb-type light emitting device lamp 100.

The graph shows the deviation value of the minimum value Min and the maximum value Max according to variation of the radius of curvature radius, and it is possible to see that a range of the radius of curvature R1 may be set to make the deviation value within a predetermined value. For example, in order to make the deviation value within 20%, the curvature radius R1 may have a range below.

$$1.5 \text{ mm} < R1 < 4 \text{ mm}$$

Figure 9:
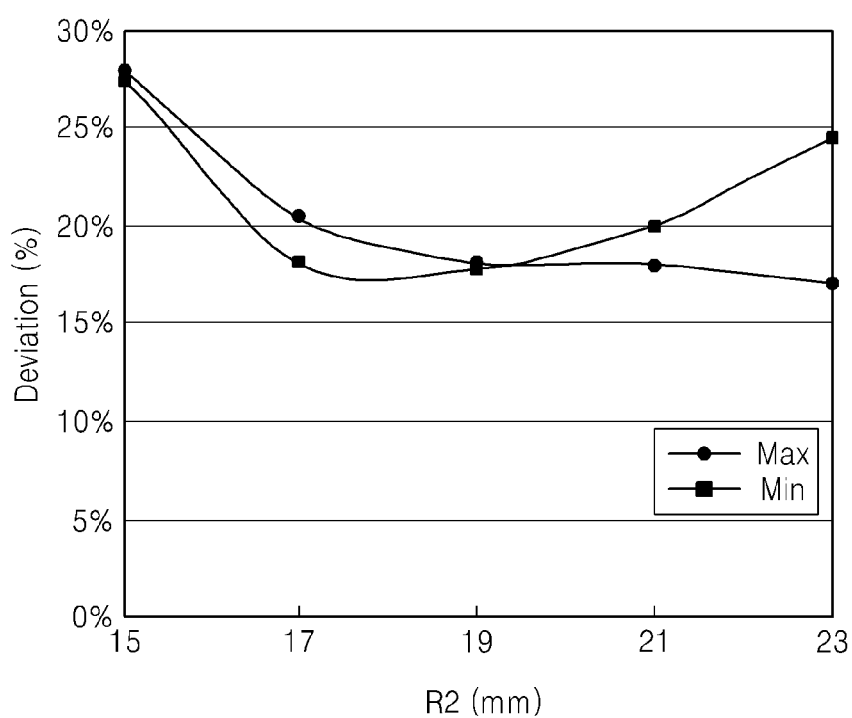
FIG. 9 is a graph showing a deviation value that a minimum value and a maximum value of light distribution deviates from an average value, with respect to a radius of curvature of a second incident surface of a lens used in the bulb-type light emitting device lamp of FIG. 5.

FIG. 9 is a graph showing a deviation value that a minimum value Min and a maximum value Max of light distribution deviate from an average value, with respect to a radius of curvature R2 of a second incident surface of a lens used in the bulb-type light emitting device lamp 100 of FIG. 5.

The graph shows the deviation value of the minimum value Min and the maximum value Max according to variation of the radius of curvature R2, and it is possible to see that a range of the curvature radius R2 may be set to make the deviation value within a predetermined value. For example, in order to make the deviation value within 20%, the curvature radius R2 may have a range below.

$$17 \text{ mm} < R2 < 21 \text{ mm}$$

The bulb-type light emitting device lamp according to the one or more embodiments of the present invention employs the semiconductor light emitting device and thus provides an illumination equipment with low power consumption and an eco-friendly characteristic. Also, the bulb-type light emitting device lamp realizes light distribution that is almost equal to light distribution of a general incandescent electric bulb, i.e., the bulb-type light emitting device lamp realizes light distribution that is almost uniform in every direction.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A lens for changing light distribution of incident illumination light and emitting the illumination light, the lens comprising:
   a light incident surface comprising a first curved surface having a first curvature and a second curved surface having a second curvature, which is different from the first curvature;
   a top surface; and
   a side surface which is uneven,
   wherein a majority of the transmitted through the first curved surface is emitted via the top surface, and a majority of the light incident on the second curved surface is emitted via the side surface, and
   wherein the lens is rotationally symmetric with respect to a central axis and an outmost diameter of the lens is constant with respect to a height of the lens.

2. The lens of claim 1, wherein the top surface is planar.

3. The lens of claim 1, wherein first curved surface is centrally disposed with respect to the lens, and the second curved surface surrounds an outer perimeter of the first curved surface, and wherein an amount of light transmitted through the second curved surface is greater than an amount of light transmitted through the first curved surface.

4. The lens of claim 1, wherein the first curved surface is centrally disposed with respect to the lens, and the second curved surface surrounds an outer perimeter of the first curved surface, and wherein the first curved surface is concave and the second curved surface is convex.

5. The lens of claim 1, wherein the light incident surface faces the top surface.

6. The lens of claim 5, wherein the first curved surface is concave and the second curved surface is convex.

7. The lens of claim 6, wherein a radius of curvature of the first curved surface is smaller than a radius of curvature of the second curved surface.

8. The lens of claim 1, wherein the first curved-surface is a concave surface which diverges light incident thereon, and
   the second curved-surface is a convex surface which converges light incident thereon.

9. The lens of claim 8, wherein the first curved-surface is a spherical surface whose radius of curvature R1 satisfies an inequality below, $$1.5 \text{ mm} < R1 < 4 \text{ mm}.$$

10. The lens of claim 8, wherein the second curved-surface is a spherical surface whose radius of curvature R2 satisfies an inequality below, $$17 \text{ mm} < R2 < 21 \text{ mm}.$$

11. The lens of claim 1, further comprising a planar bottom surface that connects the light incident surface and the side surface.

12. The lens of claim 1, wherein incident light having a distribution angle within 180° is dispersed by the lens such that output light has a distribution angle equal to or greater than 300°.

13. A bulb-type light emitting device lamp comprising:
    a light emitting device package comprising a light emitting device;
    a body comprising a mount surface on which the light emitting device package is mounted, wherein the body is formed of a heat radiation material;

the lens of claim 1, which is disposed such that light emitted from the light emitting device is incident on the incident surface; and a cover which entirely covers the light emitting device package and the lens, wherein the cover is formed of a transparent material that is mixed with a diffusion material.

14. A lens for changing a distribution of incident light, the lens comprising:

a top surface which is planar;

a light incident surface, opposite the top surface, wherein the light incident surface comprises a first curved surface which is concave and has a first curvature and a second curved surface which is convex and has a second curvature, different form the first curvature;

a side surface which is prismatic;

wherein the first curved surface is centrally disposed with respect to the lens, and the second curved surface surrounds an outer perimeter of the first curved surface.

15. The lens of claim 14, wherein a majority of light transmitted through the first curved surface is emitted via the top surface, and a majority of the light transmitted through the second curved surface is output via the side surface.

16. The lens of claim 14, wherein a radius of curvature of the first curved surface is smaller than a radius of curvature of the second curved surface.

17. The lens of claim 14, wherein an amount of light transmitted through the second curved surface is greater than an amount of light transmitted through the first curved surface.

* * * * *